(12) United States Patent
Nolt

(10) Patent No.: US 8,944,720 B2
(45) Date of Patent: Feb. 3, 2015

(54) FLUID CONTAINMENT AND MANAGEMENT SYSTEM

(71) Applicant: D.A. Nolt, Inc., Berlin, NJ (US)

(72) Inventor: David A. Nolt, Berlin, NJ (US)

(73) Assignee: D.A. Nolt, Inc., Berlin, NJ (US)

( * ) Notice: Subject to any disclaimer, the term of this patent is extended or adjusted under 35 U.S.C. 154(b) by 109 days.

(21) Appl. No.: 13/573,812

(22) Filed: Oct. 5, 2012

(65) Prior Publication Data

US 2013/0089376 A1   Apr. 11, 2013

Related U.S. Application Data

(60) Provisional application No. 61/627,297, filed on Oct. 7, 2011, provisional application No. 61/685,647, filed on Mar. 21, 2012.

(51) Int. Cl.
*B65G 5/00* (2006.01)

(52) U.S. Cl.
CPC ........................................ *B65G 5/00* (2013.01)
USPC ............................................ 405/54; 52/169.7

(58) Field of Classification Search
CPC ....... E02D 31/00; E02D 31/004; E02D 17/18; F17C 3/005; B65D 90/24; B65G 5/00; B65G 5/005
USPC ....................................................... 405/52–55
See application file for complete search history.

(56) References Cited

U.S. PATENT DOCUMENTS

| | | | | |
|---|---|---|---|---|
| 234,185 A | * | 11/1880 | Hendrick | 52/169.7 |
| 734,045 A | * | 7/1903 | Castleman | 405/53 |
| 1,200,391 A | * | 10/1916 | Munn | 405/53 |
| 3,092,933 A | * | 6/1963 | Closner et al. | 52/223.2 |
| 3,383,863 A | * | 5/1968 | Berry | 405/270 |
| 3,461,673 A | * | 8/1969 | Slover | 405/270 |
| 3,930,590 A | * | 1/1976 | Ebbrell | 220/560.03 |
| 4,352,601 A | * | 10/1982 | Valiga et al. | 405/270 |
| 4,362,434 A | * | 12/1982 | Valiga et al. | 405/129.57 |
| 4,388,357 A | * | 6/1983 | Luebke | 428/57 |
| 4,425,743 A | * | 1/1984 | Bartur | 52/169.5 |
| 4,439,062 A | * | 3/1984 | Kingsbury | 588/259 |
| 4,543,013 A | * | 9/1985 | Wagner et al. | 405/129.7 |
| 4,624,604 A | * | 11/1986 | Wagner et al. | 405/129.7 |
| 4,966,492 A | * | 10/1990 | Poyda | 405/129.6 |

(Continued)

FOREIGN PATENT DOCUMENTS

| | | |
|---|---|---|
| RU | 21 878 | 2/2002 |
| RU | 2 182 215 | 5/2002 |
| SU | 1 794 985 | 2/1993 |

*Primary Examiner* — Tara M. Pinnock
(74) *Attorney, Agent, or Firm* — Duane Morris LLP

(57) ABSTRACT

A system for containing and managing fluids produced at a work site, such as an oil or gas drilling site, includes one or more fluid containments formed as a basin for collecting and retaining fluids, a berm forming a perimeter of the containments, a layer of sand placed over each basin, a fluid-impermeable membrane placed over the layer of sand, and drainage stone placed over the membrane, filling the basin. A geotextile fabric can be placed over the membrane to help protect the membrane from adverse affects of the drainage stone. A leak detection system can be coupled with the membrane to identify potential leaks in a containment system. One or more catch basins can extend through the basin and the drainage stone filling the basin, to receive fluids. A drainage system is placed in fluid communication with the catch basins to drain fluids from a containment.

33 Claims, 11 Drawing Sheets

(56) References Cited

U.S. PATENT DOCUMENTS

| | | | | |
|---|---|---|---|---|
| 5,056,960 A | * | 10/1991 | Marienfeld | 405/270 |
| 5,078,543 A | * | 1/1992 | Terrel | 405/129.57 |
| 5,288,168 A | * | 2/1994 | Spencer | 405/54 |
| 5,544,976 A | * | 8/1996 | Marchbanks | 405/129.6 |
| 5,663,490 A | * | 9/1997 | Kozen | 73/49.2 |
| 5,747,134 A | * | 5/1998 | Mohammed et al. | 428/57 |
| 6,146,051 A | * | 11/2000 | Pratt | 404/2 |
| 6,317,901 B1 | * | 11/2001 | Corpuel | 4/487 |
| 2002/0064425 A1 | * | 5/2002 | Stanton | 405/53 |
| 2005/0051480 A1 | | 3/2005 | Newman | |

* cited by examiner

FLUID CONTAINMENT AND MANAGEMENT SYSTEM

BACKGROUND OF THE INVENTION

The present invention generally relates to a system for the effective containment of fluids, primarily precipitation and effluent arising from operations at a given site, and for management of the contained fluids. The system is particularly well suited to sites intended for gas and oil well drilling, but is also useful with sites for performing other functions that can benefit from improved fluid containment and management, including water, sewage and storm water systems.

There are currently no consistent regulatory standards, from state to state, governing the construction of environmental protection systems used in the oil and gas exploration and extraction industries. About 80% of states require a raised dike system around storage tanks for produced water and separator tanks for receiving oil, gas and produced water. Some, but not all states require impermeable liners within the dikes. Fluid storage basins are also used for the temporary storage of well production fluids and produced water. However, these basins are lined with an impermeable membrane that is typically not resistant to puncture or shear stresses.

Typical protection for the well pad itself is often limited to a peripheral dike or berm surrounding the well pad. As an added measure of protection, some installations have used a flexible, 20 mil plastic sheet laid over a 2 foot thick layer of a modified base material, typically limestone. In practice, however, such installations have been found to be susceptible to tire damage from the many heavy vehicles often used at such sites, often having weights on the order of 80,000 lbs., particularly for pressurized fracturing (generally referred to as "fracking") operations and for water transportation, as well as puncturing by metal drilling system components and other hazardous objects found on well sites.

Moreover, such membrane installations are temporary and are replaced each time there is a well workover, a re-fracking or a new drilling location on the pad, and allow water to accumulate and pool. Such membranes are also slippery to work on, and can freeze in the winter months, creating a work hazard. There is also little scientific monitoring of leakage from such fluid detention basins. Leaks are detected, if at all, by visually detecting drops in fluid levels.

As a consequence, current practices are somewhat haphazard, and have been less than adequate for their intended purpose, failing to provide an appropriate level of environmental protection from contaminants. This has recently been exhibited by single, vertically-drilled wells, as evidenced by some of the recent blow-outs and mishaps encountered in the Marcellus Shale drilling area.

Various technologies have recently been developed for use in the rapidly developing on-shore natural gas extraction industry. Such technologies have in many circumstances made current environmental protection practices wholly inadequate. For example, new drilling techniques allow a drill string to bore down to a gas-bearing shale bed and then change direction, to drill horizontally through the shale bed, often for as many as several thousand feet. Shale, however, is not highly permeable to the gas it contains, and high pressure fracking techniques must be used to open up the shale layers (sedimentary rock) and inject sand and similarly sized particles between the layers to hold them open and provide significantly increased gas flows. Directional drilling techniques can be used to allow a single, although significantly enlarged, well pad to house as many well heads as are needed to properly develop a particular site.

Such processes require the use of significant amounts of water. As a result, such installations, particularly those involving multiple wells on a single well pad, require increased fluid management resources. Horizontal well fracking takes place over thousands of feet of well bore, requiring ten, twenty, or more times the volume of fracking water that would be used in a conventional vertical well, because a vertical well intersects the shale bed for only a hundred feet or so. As much as five million gallons of water can be used in the fracking of a single well, and there can be as many as ten wells per well pad site.

Current spill management practices are wholly inadequate for protecting the environment from potential spills and leaks at these volumes, which in turn leads to the need for a new well pad environmental protection protocol.

In addition to the greatly increased volumes of fluid that can potentially spill, or leak at the well pad, the need for improved environmental protection further arises from recent high levels of exploration and development in areas where there has previously been little or no drilling. This raises considerable concerns over possible environmental damage, particularly to potable water supplies. Further complicating this is the increase in the type, number and volume of chemicals used in such well development techniques which, according to the industry, is said to include over 750 different chemicals.

Moreover, such gas wells typically have a shorter operating life than oil wells. Production levels can fall off quickly, even though shale bed gases have not been depleted significantly. This can require a significant level of re-fracking into the same well, which can in turn lead to hazards resulting from the increased number of re-fracking procedures needed. Also, as an example, and for natural gas development only in the Marcellus shales, forecasts of the number of wells to be drilled have ranged from 1,400 to 2,700 in the year 2011, from 1,600 to 3,900 for the year 2015, and from 1,700 to 4,800 for the year 2020.

A reliable process and associated system is essential for the protection of groundwater and the surrounding land from pollution. This can be achieved only through 100% containment of spills and leaks throughout all well drilling and development operations. Fracking operations, while using primarily fresh water to break open shale formations, also use several thousands of gallons of chemicals, ranging from acids to soaps to biocides and more. This would require the capacity to contain a 100,000 gallon spill within each sub-well pad section.

SUMMARY OF THE INVENTION

In accordance with the present invention, all of the precipitation and effluent arising from operations at a given site are capable of being captured, contained, held for use, analyzed and released through a drainage field (or plural fields) or to one or more tanks. Some or all of the resulting fluids can be used in subsequent operations, including fluids pumped to the surface and collected in the containment reservoirs, or the fluids can be pumped from the containment reservoirs, for removal from the site. Such fluids can be filtered or otherwise processed, either on-site, or at a remote location. In this way, any and all contaminants can be contained until removed, processed, or reused.

Such fluids can be drained using one or more trenches, or other suitable flow paths provided through an overlayment defining the site, or "pad" in the case of a well site. The pad rests on a permeable bed of solid particles of varying size, preferably comprised of washed river stone or a similar aggregate, but can alternatively be implemented using other materials, which will hereafter collectively be referred to as "drainage stone". The material selected for use preferably has voids on the order of approximately 42% to 48% in which fluids can be detained, which is the primary purpose of the resulting system.

Fluids are prevented from seeping away, through the stone and into the soil below, by an impermeable membrane placed below the stone and extending along the full area of the stone and the pad above it. At the edges of the pad, which extend laterally in all directions beyond the stone below the pad, the membrane is positioned to extend over a raised berm that follows the periphery of the pad site to completely surround the site. The membrane in this way forms an impermeable basin detaining fluids held in the stone. The membrane rests on a leveling bed, for purposes of grading as well as protection of the membrane, and slopes away from high points defined by plural berms, toward one or more manholes associated with corresponding catch basins positioned at low points formed at the site, generally, but not necessarily along the trenches.

Catch basins are placed at various locations in the pad and are set at appropriate depths for purposes of draining the stone. The catch basins can implement multiple functions including holding reservoirs for fluid retention and testing, valves for releasing fluids to local drainage fields or storage tanks, as appropriate, and as localized holding tanks from which contaminated fluids can be pumped to the surface for removal, or for reuse, for example, in a re-fracking process.

The design of a particular site will primarily depend on local factors such as topography, precipitation and soil permeability. Precipitation levels defined by "2 year" or "100 year" storm water volumes are preferably used to determine the stone to be used and the design of the membrane, while the drainage field design will primarily depend on soil permeability and site percolation testing results. However, the particular design parameters used to implement a given site will also necessarily depend on local practice. Placement of the catch basins, and the number of catch basins used, will be determined by the associated activities being performed at the site, and overall cost. For example, the catch basins are preferably placed at locations away from other structures with which the catch basins could potentially interfere.

The final design of a particular site, and determining factors such as the pipe specification for the drainage field, the number of catch basins and their spacing, and other such factors, will depend on the availability of materials, overall cost, and transportation studies, and will likely also depend on factors such as local topography, precipitation levels and percolation test results.

A leak detection system is also preferably utilized in conjunction with the system of the present invention, either as an optional feature, or as a feature incorporated with the system. The leak detection system is preferably operated with solar power made available at the site, and can be monitored either locally, or from a central monitoring station.

The installation of the present invention is important for ensuring the protection of ground water and that any fluids and contaminants produced at a given site do not seep through to the soil below during all periods including the installation of a given site, operations during drilling or fracking at the site, as well as maintenance of the site. An installation produced in accordance with the present invention can provide permanent containment throughout the life of a given installation, and can also provide a significantly safer work environment, for example, by avoiding the build-up of ice that can accumulate during winter operations.

The system of the present invention can be used with a site which is being newly developed, or can be retrofitted to an existing site. The system can easily be fitted to additional structures associated with a given site, or retrofitted to an existing site where a containment system in accordance with the present invention has already been installed. As a result, the system can readily accommodate the drilling of additional wells from a protected well pad, and can easily incorporate additional wells into the environmental protection system of the well pad. The system is modular and extendable, and can be laid out in a grid to cover pads of any size. As a result, the system can easily be installed over an entire site, or portions of a site, as is needed or preferred for a given installation. The system can be installed at any time of the year, and during all seasons, with limited constraints.

The system of the present invention incorporates an engineered, contaminant management system that can be installed in a consistent manner from site to site, while yielding reliable predetermined contaminant management outcomes. After the useful life of a given site has been reached, restoration of that site is often required, frequently including the need for remediation. To this end, the components of the site must be tested for contaminates. If the components of the site are found to be clean, the components can be removed. If not, the components found to be contaminated must be suitably processed. The membrane must also be taken up, but is formed of materials that can be fully recycled.

The system of the present invention is capable of being used over the full life cycle of a given site, and need not be removed and then reinstalled, leading to significant cost savings over the useful life of the system, as well as the mitigation of any potential damage arising from spills and contaminates from drilling and fracking processes, for example.

Complete environmental clean-up is anticipated following the abandonment of a site, or a permanent cessation of activity at the site. All materials used in constructing the system are readily removable from the site and can be recycled or safely disposed of off site. The largest components of the system are the manhole/catch basin fluid management structures, which can be hoisted and removed as a self contained unit, and reused.

The system of the present invention is useful in helping to satisfy regulatory requirements for keeping ground water and the environment safe from the standpoint of operations performed above ground. From an environmental standpoint, there are three zones to be considered in protecting the environment against contamination from drilling and production operations, including the atmosphere above the well pad, the sub-well head to well pad surface, and the down-well to sub-well head. While the system of the present invention is particularly well suited to reliable protection of the environment from pollution and chemical damage in the region from the sub-well head to the well pad surface, where most leaks, spills and other contamination incidents will occur, protection in other regions can also be improved.

For example, the system of the present invention can also help reduce problems occurring in the down-well to sub-well head region, such as blowouts or "produced" water surges, because the system of the present invention can absorb as much as the first hour's blowout effluent, and more, even under high pressure flow conditions. The system of the present invention can also help reduce volatile chemical off-gassing and evaporation from the well pad by containing the chemicals in a cooler environment, out of exposure to sunlight or weather.

Other significant environmental benefits of the system of the present invention can include containment of storm water within the pad, preventing contaminated run-off from reaching surrounding terrain and subsequent seepage into the groundwater and aquifer, complete containment of well pad spills and leaks, the speedy cleanup of leaks or spills, and the standardization of engineering quality and reliability. The system is well suited to its purpose and manages containment of contaminants injurious to the environment, and to animal and human health, because such contaminants occur at concentration levels at orders of magnitude less than those that would adversely affect the system membrane.

While the primary implementation of the system of the present invention is under-pad containment within the boundaries of the drilling and fracking operations, the system could and should preferably be expanded to include the entire well pad, providing a short, medium and long term solution to various problems of environmental protection at the well pad site.

This, in turn, helps address various socio-political concerns and considerations confronting such exploration and extraction processes. For example, well drilling has caused concern among residents living even several miles away from any individual well pad, including the fear of contamination of the groundwater and the aquifer. Another concern is the possibility of the "quick kill" effect of produced water spills, potentially due to downhole brine produced within and contained below the gas in the shale beds, on affected vegetation.

The system of the present invention directly addresses such concerns, particularly those related to groundwater pollution, which directly affects those relying on shallow wells for potable water. This is accomplished by directly addressing produced water spillage, which is environmentally injurious because salinity levels can be 10 to 12 times that of seawater, and its effects on vegetation.

The system of the present invention, therefore, provides the potential for standards for installations where few relevant standards currently exist. This can, in turn, provide regulators, and those with environmental concerns, a rational engineering-based standard for environmental protection of well pad operations by providing a defensible basis for the establishment of standard practices. Use of the system of the present invention also has the potential to offer more orderly progress through the well drilling and production permitting processes.

DETAILED DESCRIPTION OF PREFERRED EMBODIMENTS

Figure 1:
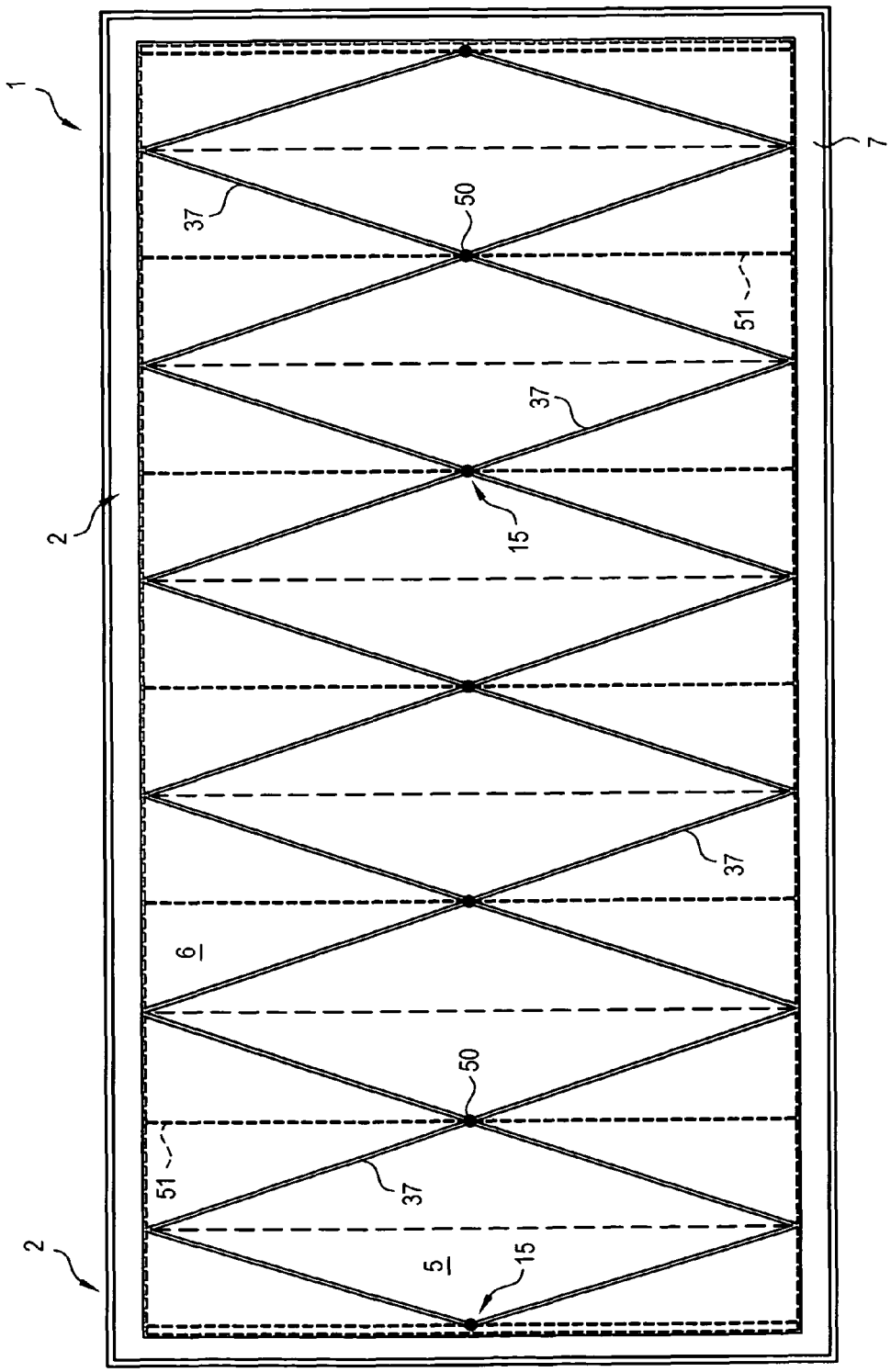
FIG. 1 is a plan view illustrating an example of a site incorporating the fluid containment system of the present invention.

FIG. 1 illustrates a site incorporating the fluid containment and management system of the present invention. In the illustrated example, the site is a well pad 1 which is typically used for the extraction of natural gas from shale using a "pressurized fracturing" process, which is commonly referred to as "fracking". It is to be understood, however, that the illustrated well pad 1 is only one example of any of a number of implementations that can make use of the fluid containment and management system of the present invention. For example, the illustrated well pad 1 is generally rectangular, having an area on the order of 180,000 square feet, which is typical for a fracking operation. Nevertheless, both the shape and the size of the well pad 1 can be varied to suit a particular application, location or operating environment, as desired. Variations are also possible to accommodate use of the well pad 1 for other types of drilling operations, in any of a variety of fields other than fracking for purposes of extracting natural gas from shale, including other types of gas and oil well drilling, and various related peripheral activities, for other applications such as water, sewage and storm water management, or for other installations that would benefit from efficient and cost-effective containment and management of the fluids being processed.

In order to describe the fluid containment and management system of the present invention, the description which follows is given in the general context of a typical installation used for the extraction of natural gas from shale using a fracking process. It is to be understood, however, that the description which is to follow is only illustrative of one such system, and that the overall configuration of the described system, and in particular the dimensions discussed and the materials described for use in implementing such a system, can be freely varied to suit a particular application. As a consequence, the description which follows is not to be interpreted as a limitation of the scope or applicability of a fluid containment and management system produced in accordance with the present invention.

Referring to FIG. 1, the entire well pad 1 has been fitted with containment systems 2 sized and configured to cover the entire area of the well pad 1. Providing the entire site with containment systems 2 is considered to be preferred, and can be accomplished during construction, in anticipation of the later development of all portions of the well pad 1 for its intended purpose, and to maximize fluid containment at the site. As an alternative, containment systems 2 can be provided in selected regions of the well pad 1, for example, only in regions that are actively being operated, for purposes of cost reduction. Irrespective of the specific configuration of the well pad 1, any portions of the well pad 1 where protection of the environment is necessary or desirable are preferably provided with one or more containment systems 2, as appropriate or desirable.

In the illustrative installation shown in FIG. 1, the entire well pad 1 (having typical dimensions of a 300 foot width and a 600 foot length) has been provided with a series of seven containment systems 2. The two outermost containment systems 5 have typical dimensions of about 50 feet in width and 300 feet in length. The other containment systems 6 each have typical dimensions of about 100 feet in width and 300 feet in length. The location of the various features associated with each of the containment systems 2 will primarily depend upon the location of the well heads to be developed within each area of containment, the location of other support equipment within each area of containment, and the overall topography of the site, for example, streams or other water sources, or other geological formations to be avoided. The various containment systems 2 can either have different sizes and shapes, as is shown in FIG. 1, for purposes of accommodating varied well head placements, or can all be the same size and shape, if appropriate for a particular installation.

Figure 2:
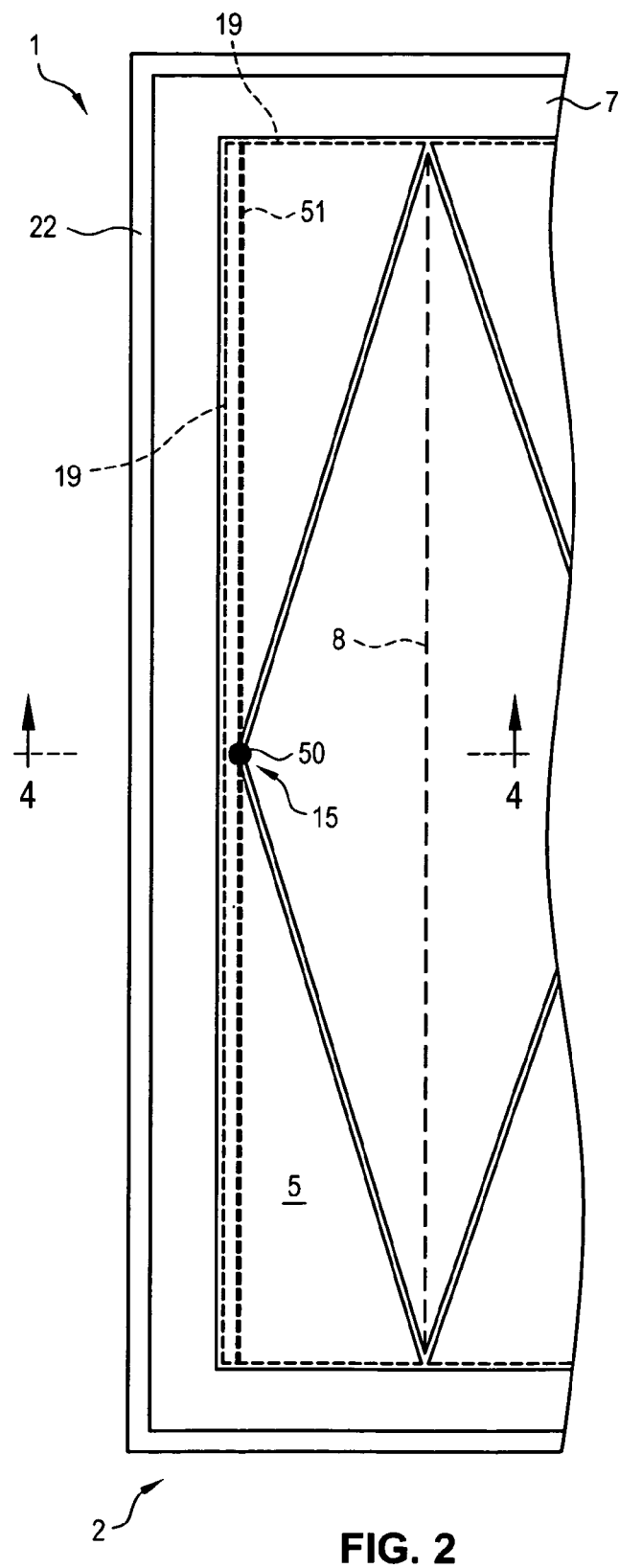
FIGS. 2 and 3 are enlarged plan views showing two of the containment systems shown in FIG. 1 in greater detail.
Figure 3:
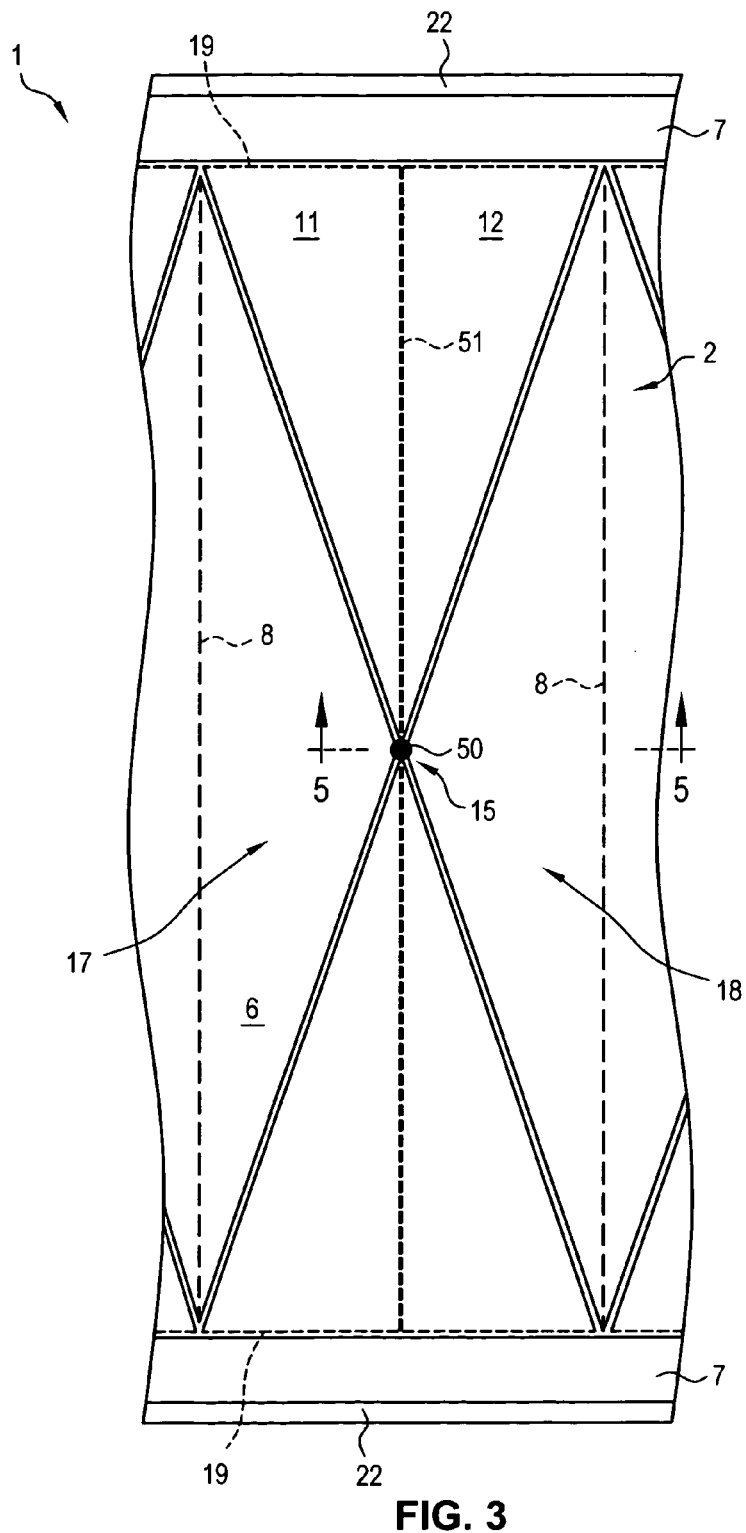
Figure 4:
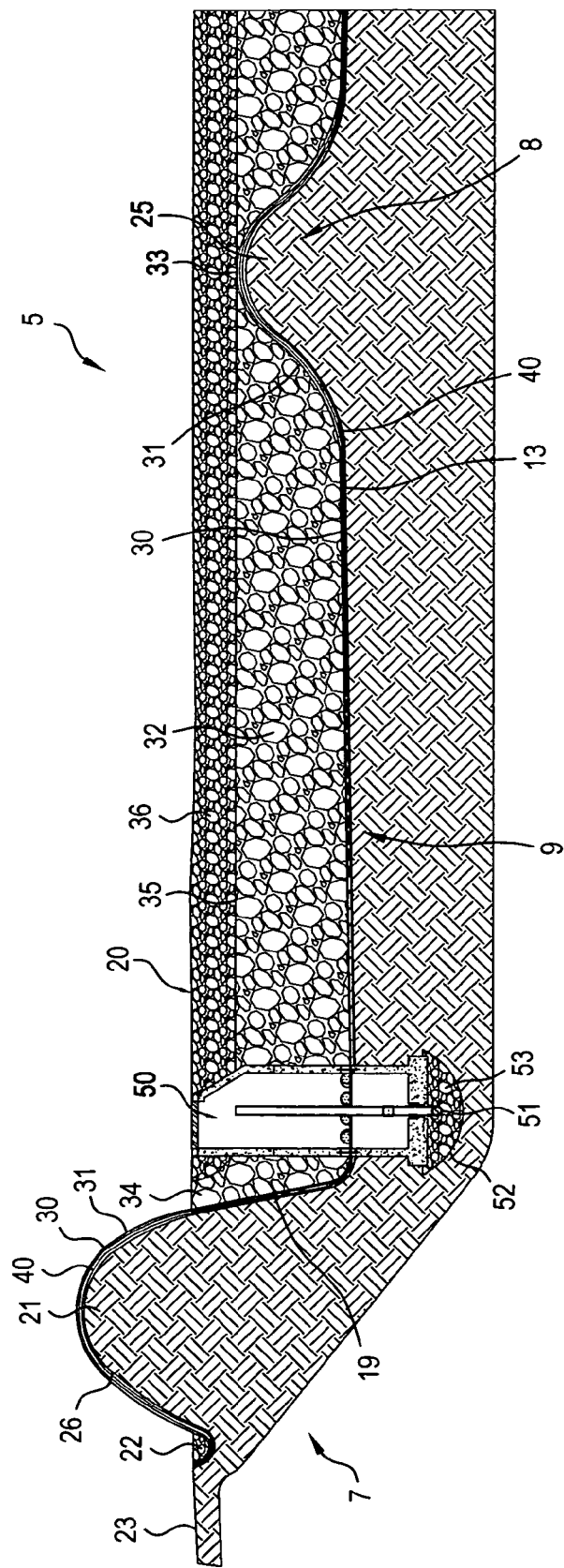
FIG. 4 is a cross-sectional view taken along the line 4-4 shown in FIG. 2.

FIGS. 2 and 3 are enlarged views of two of the containment systems 2 shown in FIG. 1. FIG. 2 shows a containment system 5 located at the leftmost position shown in FIG. 1. FIG. 3 shows one of the centrally located containment systems, shown at 6 in FIG. 1. Reference is also made to FIG. 4, which shows a cross-section taken along the width of the containment system 5 shown in FIG. 2, and to FIG. 5, which shows a cross-section taken along the width of the containment system 6 shown in FIG. 3.

The outer periphery of the containment system 5 is bordered by a berm 7 on three of its four edges. The fourth edge of the containment system 5 is bordered by a separator 8, to complete the resulting containment system 5. The outer periphery of the containment system 6 is bordered by the berm 7 on two opposing edges, and two separators 8 are provided to complete the resulting containment system 6. Such features can change, as desired to suit a particular installation. For example, in the case of an installation having only a single containment system 2, all four of the edges of the containment system would then be bordered by the berm 7.

The perimeter of the containment system 5 defines a generally rectangular basin 9 located between the berm 7 and the separator 8, which is also formed as a berm. The containment system 6 defines a generally rectangular basin 10 located between two berms forming the opposing separators 8, and which is preferably bisected into two rectangular regions 11, 12.

Figure 5:
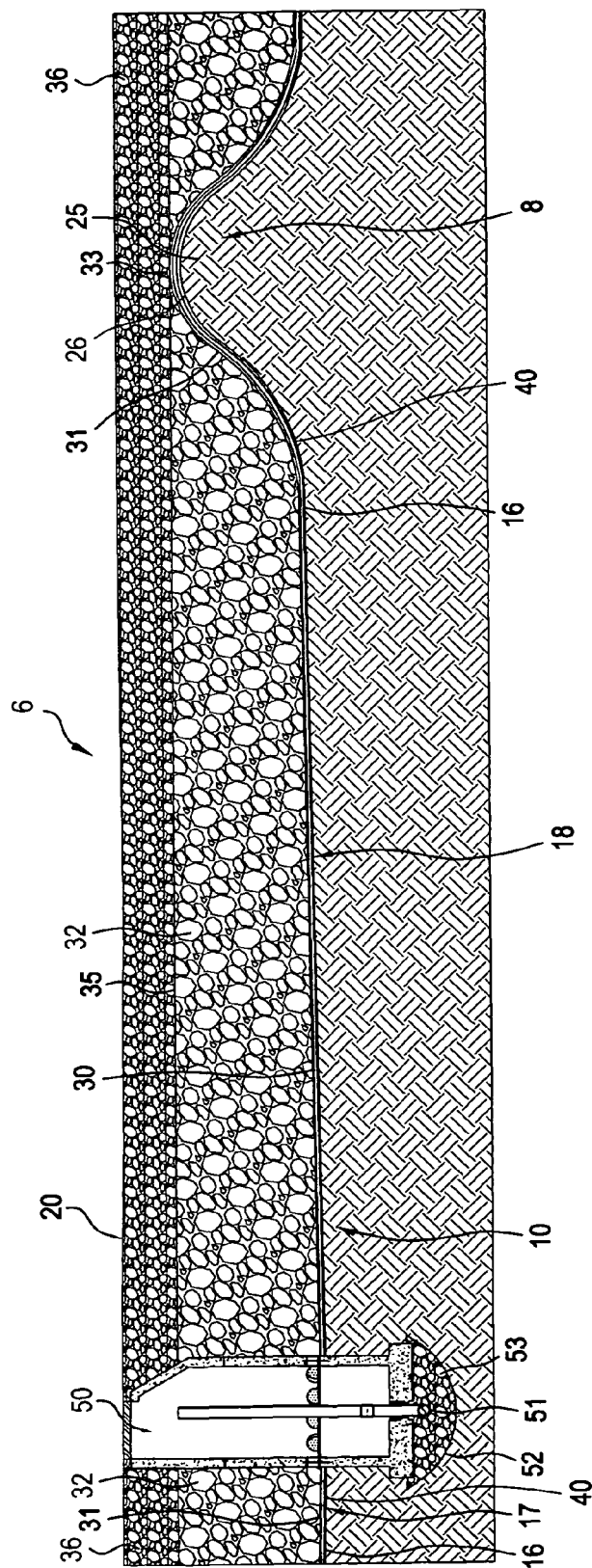
FIG. 5 is a cross-sectional view taken along the line 5-5 shown in FIG. 3.

Referring to FIG. 4, the containment system 5 rests on a bottom 13 of the basin 9, which is preferably pitched from the berm 8 toward a drainage system 15, to direct fluids toward the drainage system 15. Referring to FIG. 5, the containment system 6 rests on a bottom 16 of the basin 10, which is bisected into surface regions 17, 18 by the drainage system 15. The surface regions 17, 18 are pitched from the berms 8 toward the drainage system 15, to direct fluids toward the drainage system 15.

Each of the surfaces 13, 17, 18 is preferably pitched toward the drainage system 15 to direct fluids toward the drainage system 15. The pitch associated with the surfaces 13, 17, 18 will typically be on the order of ⅛ inch to ½ inch per foot. A pitch on the order of ¼ inch per foot is typically provided, but can freely vary to suit a particular installation.

The foregoing parameters are given only for purposes of illustration. It is to be understood that the shapes of the various surfaces and the pitches of the surfaces 13, 17, 18 can be freely varied to suit a particular installation.

Figure 6:
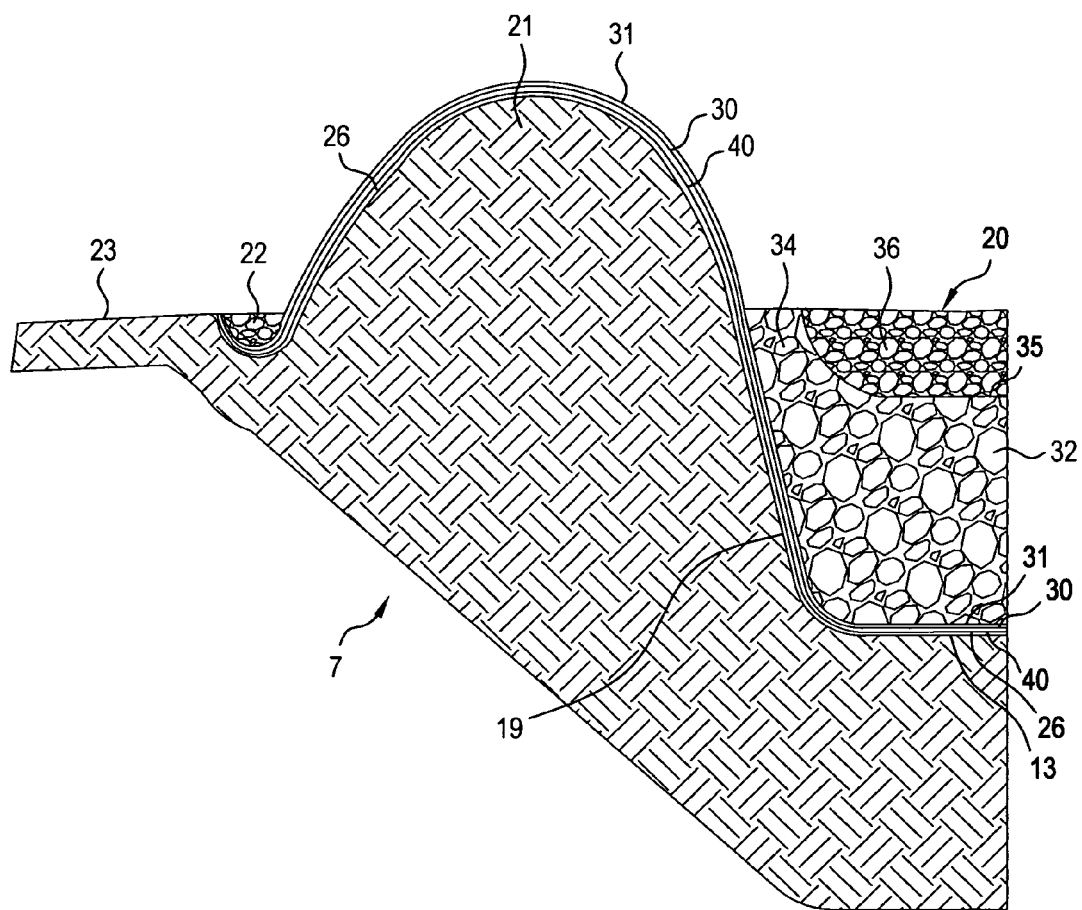
FIG. 6 is an enlarged, cross-sectional view showing a berm bordering the containment system.

FIG. 6 is an enlarged, cross-sectional view showing a typical construction of the berm 7. In the embodiment shown, the berm 7 extends upwardly from a vertical side wall 19 forming the basin 9, and above the adjacent surface 20 of the containment system 5. To this end, a mound 21 is formed between the side wall 19 and an outboard trench 22. The opposite end of the trench 22 terminates at a surface 23 having a pitch defining a grade away from the containment system 5. The mound 21 shown in FIG. 6 has a curved upper surface. As an alternative, the mound 21 can be provided with a flat upper surface, for example, to better receive equipment used in constructing the containment system 5, if preferred.

As previously indicated, the berm 7 borders three of the four edges of the containment system 5. Referring to FIGS. 4 and 5, the berm 8 defining the fourth edge of the containment system 5 is also formed as a mound 25 extending upwardly from the basins 9, 10, as will be described more fully below, so the basins 9, 10 can be made relatively deep and flat, for purposes of maximizing the amounts of fluid that can be retained within the basins 9, 10.

A typical example of an overall construction of the containment system 5 will generally proceed as follows, with reference to FIG. 6. It is to be noted that the spacings shown between the various layers of material in this and subsequent figures have been provided to clearly illustrate the referenced structures. In practice, however, such structures will be in contact with one another and the illustrated spacings will not be present.

The basin 9 is suitably excavated to develop an earthen bottom surface 13 bounded by earthen side walls 19 which extend into the earthen berms 7 forming the outer edges of the containment system 5, and an earthen berm forming the separator 8. A buffer layer 26 is placed over the bottom surface 13, the side walls 19, mound 21 and trench 22 of the berm 7, and the berm 8. An impermeable membrane 30 is then placed over the buffer layer 26, extending fully along the bottom surface 13 and the side walls 19 of the berm 7, and over the berm 8. The membrane 30 preferably extends over the top of the berm 7, and can additionally continue over the mound 21 of the berm 7 and into the trench 22, if desired. A geotextile fabric 31 is then placed over the membrane 30, extending fully along the bottom surface 13, the side walls 19 and the berm 8. A drainage layer 32 formed of a relatively course material is then placed over the geotextile fabric 31, and preferably fills the region of the basin 9 extending between the side walls 19 and the berm 8. The drainage layer 32 preferably fills the basin 9 to the high point 33 of the berm 8, and a perimeter 34 is preferably formed adjacent to the side walls 19, extending upwardly to the surface 20 of the containment system 5. An additional geotextile fabric layer 35 is then placed over the drainage layer 32, preferably extending fully along the surface of the drainage layer 32. A base layer 36 is then placed over the drainage layer 32, and is brought to the level of the surface 20, to complete the containment system 5.

The geotextile fabric 31 preferably extends over the mound 21, forming a protection course for covering the membrane 30 and for retaining the membrane 30 in position over the berm 7. The protection course developed by the geotextile fabric 31 also preferably extends through the trench 22, and the trench 22 is preferably filled with a material suitable for covering the geotextile fabric 31 and the membrane 30, and for retaining the membrane 30 and the geotextile fabric 31 in position within the trench 22. Covering the membrane 30 with the geotextile fabric 31, and filling of the trench 22, can be performed either before or after the basin 9 has been filled, as previously described.

Figure 7:
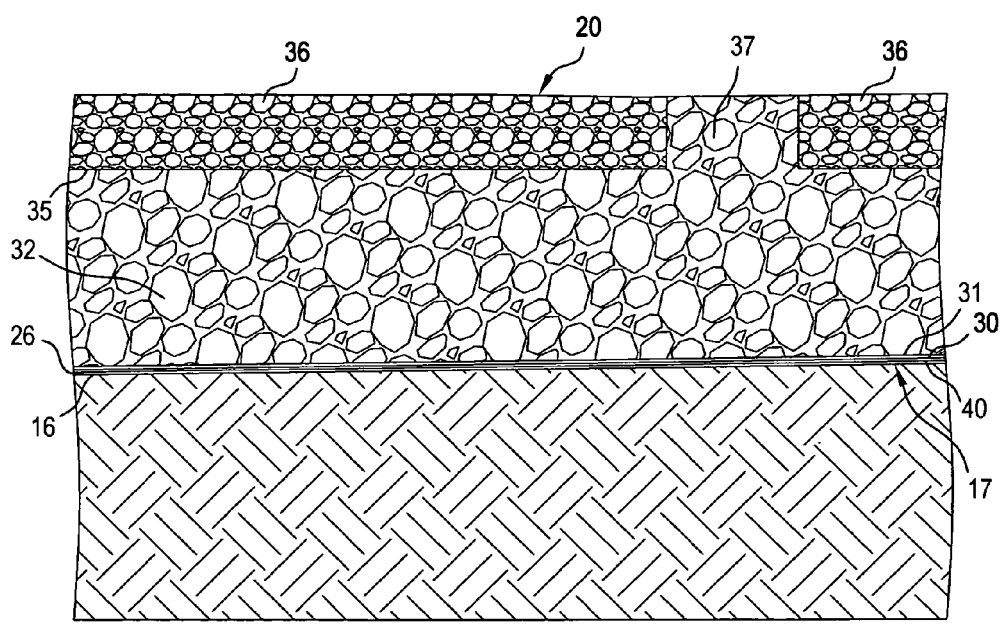
FIG. 7 is an enlarged, cross-sectional view showing a drainage median for use within a containment system.

A typical example of an overall construction of the containment system 6 will similarly proceed as follows, with further reference to FIGS. 5 and 7. The basin 10 is suitably excavated to develop the earthen bottom surfaces 17, 18, bounded by the opposing earthen side walls 19 which extend into the earthen berms 7 forming the outer edges of the containment system 6 and opposing earthen berms forming the separators 8. A buffer layer 26 is placed over the bottom surfaces 17, 18, the side walls 19, mounds 21 and trenches 22 of the opposing berms 7, and the berms 8. An impermeable membrane 30 is then placed over the buffer layer 26, extending fully along the bottom surfaces 17, 18, the side walls 19 of the berm 7, desired portions of the mounds 21 and trenches 22, and over the berms 8. A geotextile fabric 31 is then placed over the membrane 30, extending fully along the bottom surfaces 17, 18, the side walls 19 and, if desired, the mounds 21 of the berms 7, and the berms 8. A drainage layer 32 formed of a relatively course material is then placed over the geotextile fabric 31, and preferably fills the region of the basin 10 extending between the side walls 19 and the berms 8. The drainage layer 32 preferably fills the basin 10 to the high points 33 of the berms 8, and perimeters 34 are preferably formed adjacent to the side walls 19, extending upwardly to the surface 20 of the containment system 6. An additional geotextile fabric layer 35 is then placed over the drainage layer 32, preferably extending fully along the surface of the drainage layer 32. A base layer 36 is then placed over the drainage layer 32, and is brought to the level of the surface 20, to complete the containment system 6.

As an alternative, different areas of the well pad 1, and the containment systems 5, 6, can be prepared in different ways to suit a particular installation. For example, portions of one or more of the containment systems 5, 6 can be prepared to better accommodate trucks and other equipment for servicing the well pad 1. This can be done by reinforcing such areas, or by not making any subsurface modifications in such areas.

The membrane 30 is preferably formed of a material such as thermoplastic olefin or polyolefin (TPO), which is currently used in the roofing industry. Such materials provide excellent resistance to the effects of chemical exposure, and exhibit various performance and installation advantages. Installation can be accomplished using techniques which are well known and commonly used in the roofing industry, facilitating overall installation. Other materials can also be used, if desired, but are presently considered to be less preferred. Such materials can include polyvinyl chloride (PVC), chlorinated polyethylene (CPE), chlorosulfonated polyethylene (CSPE), ketone ethylene ester (KEE), ethylene propylene diene monomer (EPDM) or other equivalent thermoplastic polymers. In any event, a membrane having a thickness of from 40 mils to 135 mils is presently considered preferred. The buffer layer 26 is preferably formed with a bed of sand having a thickness of from 1 to 3 inches, although other granular materials can also be used, if desired, such as compacted aggregate by-products.

The geotextile fabrics are used to help isolate the various layers of material separated by the geotextile fabrics. For example, the use of a geotextile fabric can help prevent contaminants and debris from passing from an upper layer to the structures below, for example, to minimize the passage of contaminants and debris from the base layer 36 to the drainage layer 32, or from the drainage layer 32 to the membrane 30. Placing the geotextile fabric 35 between the base layer 36 and the drainage layer 32 also helps prevent the finer materials of the base layer 36 from entering the larger sized materials of the drainage layer 32, to help maintain the permeability of the drainage layer 32. Using the geotextile fabric 31 as a protection course for the mound 21 of the berm 7 can also help protect the underlying membrane 30. Any of a variety of geotextile fabrics which are commonly used in the construction industry can advantageously be used. For example, the "MiraDRAIN®" system available from Carlisle Coatings & Waterproofing Inc. of Wylie, Tex. (USA) can be used to implement a geotextile fabric layer. The geotextile fabric can have a weight of from 4 to 32 ounce, with a 16-ounce weight currently being preferred. As alternatives, other materials capable of developing a protective layer can be used instead of a geotextile fabric, and a conventional rubber mat can be used to implement the protection course for the mound 21, if desired.

The drainage layer 32 and the perimeter 34 are preferably formed of a material such as river rock, sized from 1 inch to 5 inches, with a 3-inch size being preferred. However, other types of drainage stone can also be used, such as 2B drainage gravel, if desired for a particular installation. The depth of the drainage layer 32 along the bottom of the basins 9, 10 will vary with the pitch of the bottom surfaces 13, 17, 18. In the illustrative example shown in FIGS. 4 and 5, the drainage layer 32 has a depth on the order of 6 feet. The perimeter 34 preferably has a width on the order of 1 to 6 feet, and a depth equal to the depth of the drainage layer 32 and the base layer 36.

The buffer layer 26 is provided to help protect the membrane 30 from the potentially adverse affects of the material which forms the drainage layer 32, and is preferably formed as a sand bed having a thickness of from 1 inch to 3 inches.

The base layer 36 is preferably formed of a material such as modified gravel, for example, using 2A drainage gravel having a depth on the order of 24 inches. Modified gravel is also preferably used to fill the trench 22, as has previously been described. In some applications, compaction of the modified gravel forming the base layer 36 can adversely affect drainage through the base layer 36 to the drainage layer 32 below. This can be accommodated by providing one or more drainage medians 37 extending through the base layer 36. As an example, the network of drainage medians 37 shown in FIG. 1 can be provided to assist with drainage to the layer 32 below. Referring to FIG. 7, the drainage medians 37 are preferably formed of a material such as river rock, sized from 1 inch to 5 inches, with a 3-inch size being preferred. Other types of drainage stone can also be used, such as 2B drainage gravel, if desired for a particular installation. In the illustrative example shown in FIG. 7, the drainage median 37 has a depth on the order of 2 feet and a width on the order of 18 inches.

The berm 7 can have a width on the order of 12 feet and a height on the order of 6 feet. The trench 22 can have a width on the order of 1 foot and a depth on the order of 18 inches.

All of the foregoing parameters can be varied to suit a particular application, location or operating environment, or to suit a particular installation, as desired. Any of a variety of different types of drainage stone materials can be used to form the various structures associated with the containment systems 2, although the use of limestone materials is currently considered to be less preferred.

For most applications, use of a sand bed having a thickness of from 1 to 3 inches as the buffer layer 26 should serve to prevent damage to the membrane 30 resulting from the potentially adverse affects of the material forming the drainage layer 32. There may also be some applications where additional assurances would be desirable to ensure that there is no leakage through the membrane 30, into the earthen bottom 13, 17, 18, the side walls 19 or the berms 8 of the basins 9, 10, and into the environment. In such applications, a leak detection system can be provided as an additional measure of protection.

Such a leak detection system can be implemented using a leak detection grid 40 mated with the impermeable membrane 30 in a manner which is suited to the specific composition of a given installation and the type of leak detection system used, and which is electrically connected to a suitable monitoring device. The leak detection grid 40 is preferably placed beneath the impermeable membrane 30 to effectively detect leakage through the membrane 30.

As an alternative to implementation of the leak detection grid 40 and the impermeable membrane 30 as two separate components, the impermeable membrane 30 can be provided with conductive elements to produce a single structure incorporating the leak detection system. This is preferably accomplished by replacing or supplementing the fibrous web structures currently used to reinforce conventional impermeable membranes with a conductive structure, which is preferably located between the outer membrane layers which conventionally form an impermeable membrane. Although a variety of conductive structures can be used for this, the use of a conductive foil layer, a sprayed conductive layer, or a finely meshed screen is currently considered preferred to enable a leak to be more accurately located, which is of particular importance for the relatively large footprint of installations such as the well pad 1.

The leak detection system can advantageously be operated using solar power made available at the site, and can be monitored either locally, or from a central station. Such monitoring can take place during active periods, such as drilling, development, maintenance and workovers, and during inactive periods, for example, to provide for storm water management. Such a leak detection system can be implemented using the Electric Field Vector Mapping® (EFVM®) technology available from International Leak Detection (ILD®) of Des Plaines, Ill. (USA), together with their ProtectSys® monitoring system.

Figure 8:
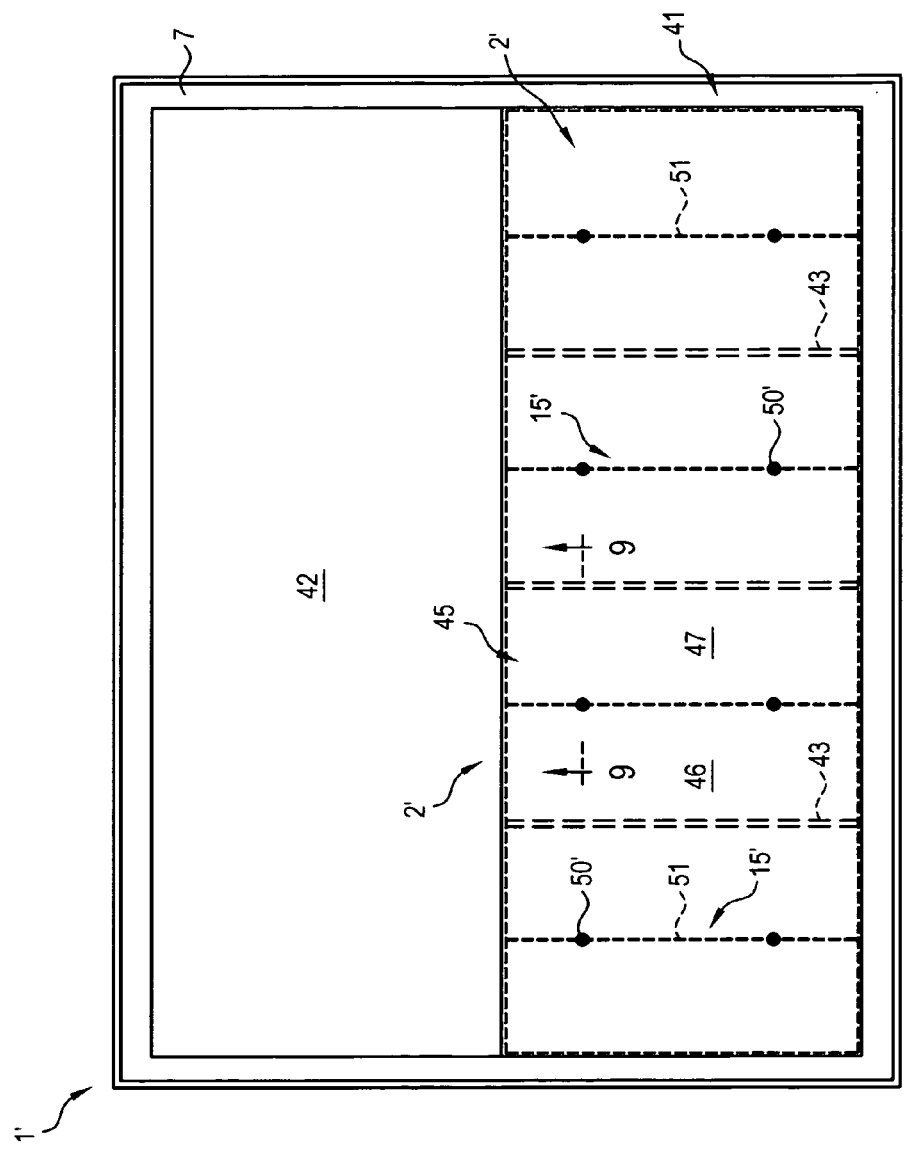
FIG. 8 is a plan view illustrating an example of an alternative site incorporating the fluid containment system of the present invention.
Figure 9:
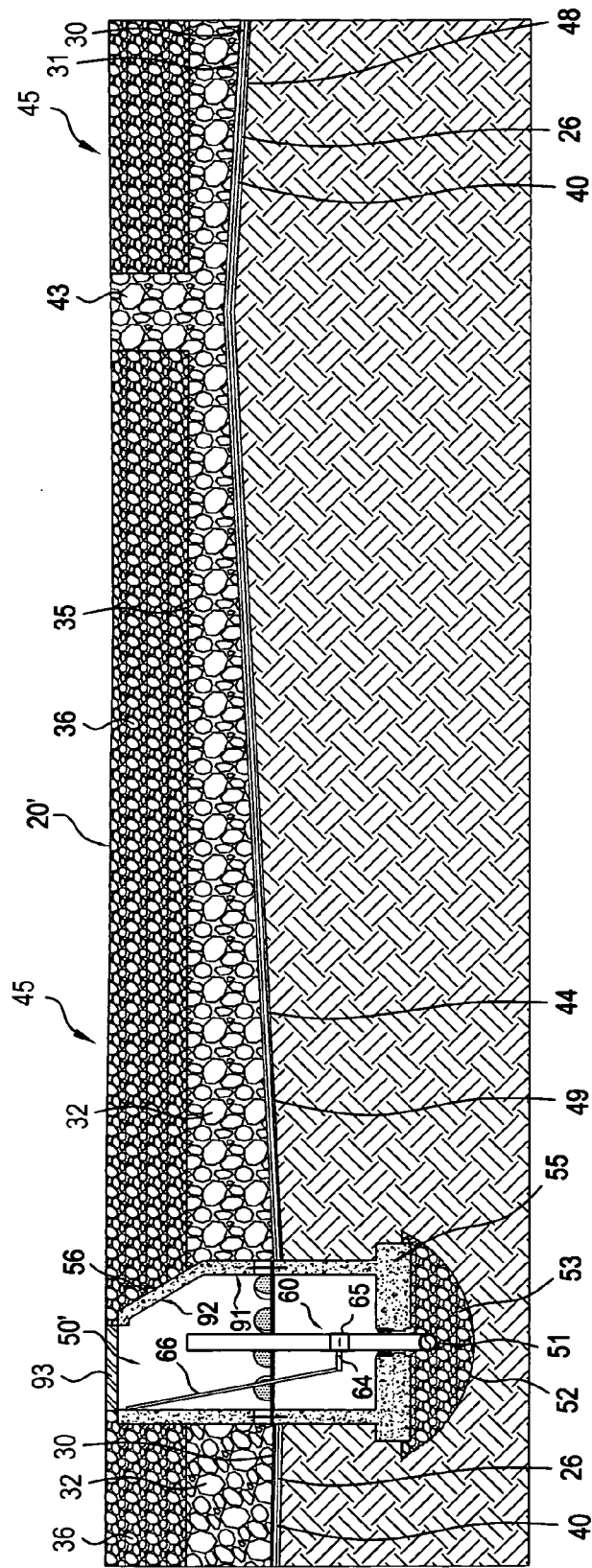
FIG. 9 is a cross-sectional view taken along the line 9-9 shown in FIG. 8.

The well pad illustrated in FIGS. 1 to 7 is only one example of any of a number of installations that can be developed using the fluid containment and management system of the present invention. Another such implementation is shown in FIGS. 8 and 9. The well pad 1' shown in FIGS. 8 and 9 has various features in common with the well pad 1 shown in FIGS. 1 to 7. Various differences are also illustrated.

For example, the well pad 1' shown in FIG. 8 is somewhat smaller, having an area on the order of 150,000 square feet. In addition, only portions of the well pad 1' are provided with containment systems 2'. In this way, only selected regions 41 where protection of the environment is necessary or desirable are provided with containment systems 2', for example, in the regions of the well pad 1' that are actively being operated, for purposes of cost reduction. As a further alternative, the entire well pad 1' can be fitted with containment systems 2' sized and configured to cover the entire area of the well pad 1', if desired.

In the installation shown in FIG. 8, half 41 of the well pad 1' (having typical dimensions of a 300 foot width and a 500 foot length) has been provided with containment systems 2', while the remaining half 42 of the well pad 1' is left without containment capabilities. The unprotected areas 42 of the well pad 1' can later be retrofitted with containment systems 2', if desired, potentially making use of recyclable materials taken from the initially installed containment systems 2' to yield savings in both costs and materials over the useful life of the well pad 1'.

In the illustrated installation, four containment systems 2' are provided, each having typical dimensions of about 125 feet in width and 150 feet in length, and each having the same overall configuration. The location of the various features associated with each of the containment systems 2' has also been varied, in particular, the various components of the drainage systems 15' associated with the containment systems 2'. Also, in the configuration shown, the drainage systems 15' each include two catch basins 50', joined by correspondingly configured drain pipes 51.

The outer periphery of the well pad 1' is bordered by a berm 7. Remaining edges of the containment systems 2' are established by medians 43 capable of cooperating with adjacent containment systems 2'. Referring to FIG. 9, the medians 43 extend upwardly from the bottom 44 of the basins 45, at a high point relative to the surface 20' of the containment systems 2', to promote drainage toward the drainage systems 15'. Conventional 2B drainage gravel is preferably used to construct the medians 43, which can have a typical width on the order of 18 inches and a depth on the order of 24 inches. The composition of the medians 43, as well as the dimensions selected for use, can also be freely varied to suit a particular installation. The installation shown in FIG. 8 does not include the drainage medians 37 shown in FIG. 1. The installation shown in FIG. 8 can additionally be provided with drainage medians 37, either similar to those shown in FIG. 1, or having some other configuration, as desired.

The perimeter of each containment system 2', whether bordered by the berm 7, by the medians 43, or by berms 8, defines a generally rectangular basin 45 which is preferably bisected into two rectangular regions 46, 47 by a drainage system 15'. Each containment system 2' rests on the bottom 44 of one of the basins 45, which is similarly bisected into surface regions 48, 49 by the drainage system 15'. Each of the surfaces 48, 49 is preferably pitched toward the drainage system 15' to direct fluids toward the drainage system 15'. The pitch associated with the surfaces 48, 49 will typically be on the order of ⅛ inch to ½ inch per foot. It is to be understood that the shapes of the various surfaces and the pitches of the surfaces 48, 49 can also be freely varied to suit a particular installation.

Figure 10:
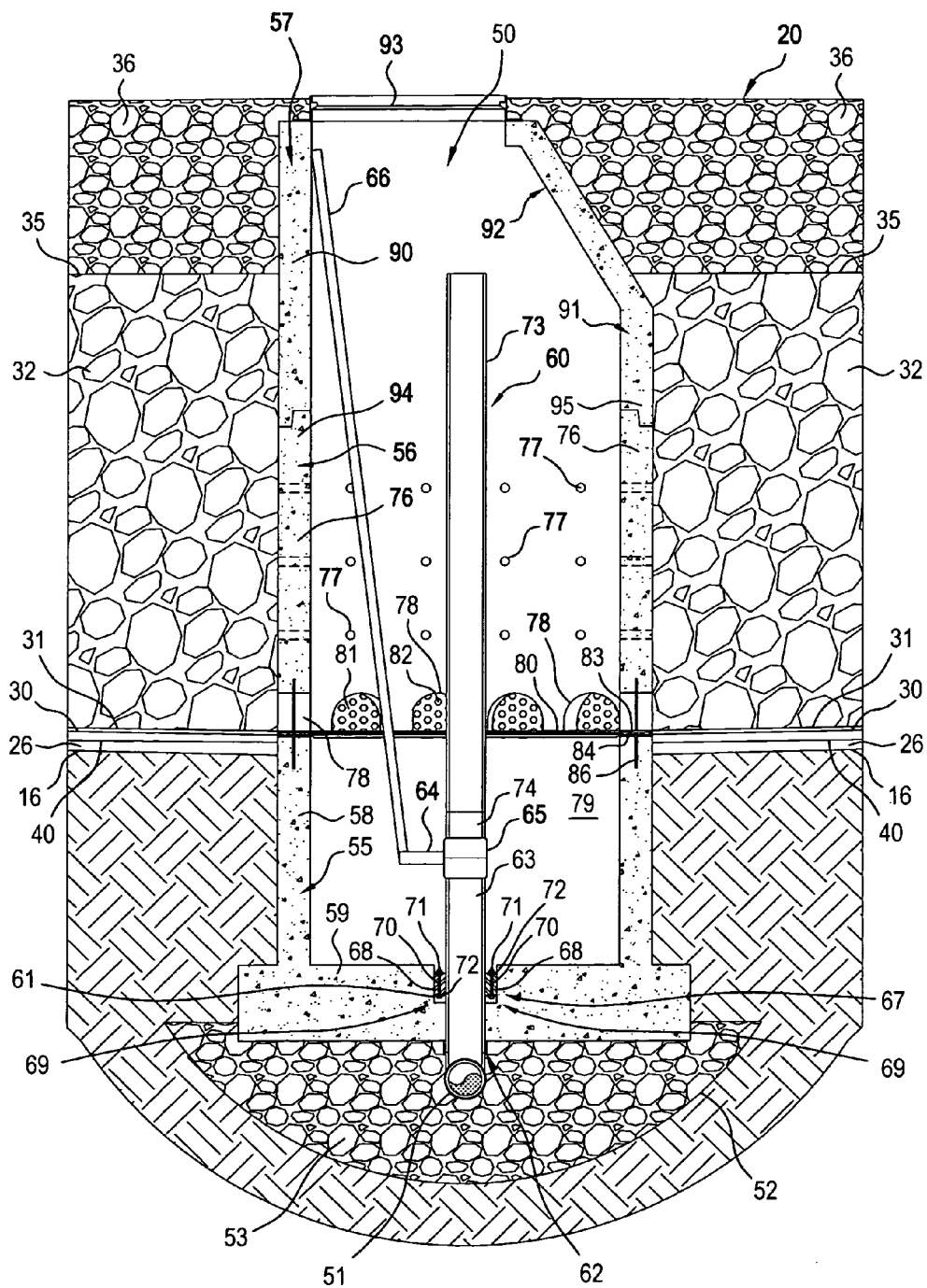
FIG. 10 is a cross-sectional view of one of the catch basins shown in FIG. 1.
Figure 11:
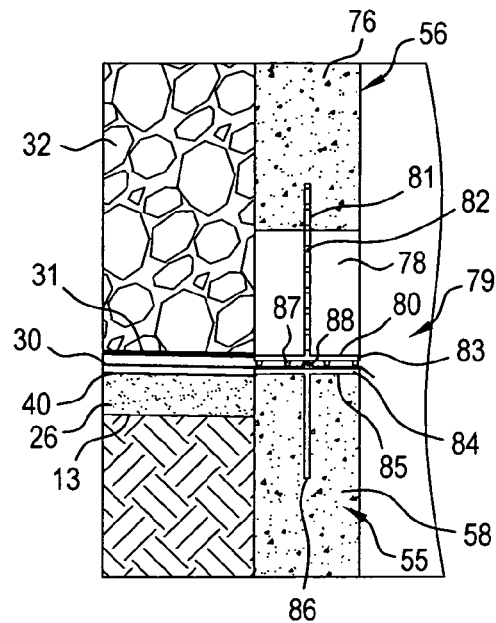
FIG. 11 is an enlarged, cross-sectional view of the connection between the base ring and the riser ring of the catch basin shown in FIG. 10.
Figure 12:
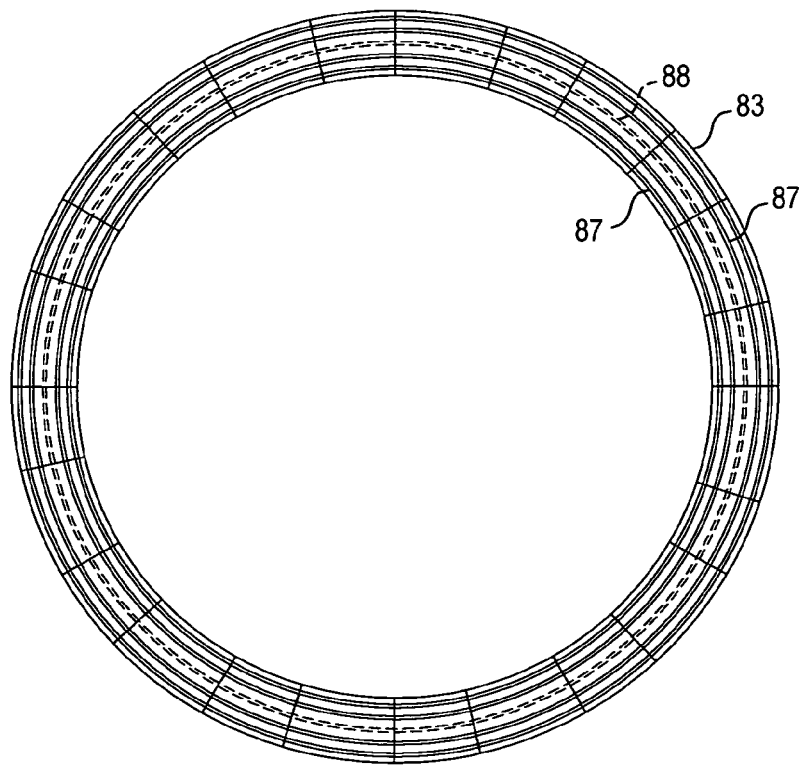
FIG. 12 is a top plan view of a compression ring for joining the base ring and the riser ring of the catch basin shown in FIG. 10.

A preferred drainage system 15, 15' for use with the containment systems 2, 2' previously described is shown in FIGS. 10 to 12. The preferred drainage system 15, 15' generally includes at least one, and in some cases, plural catch basins 50, 50' in combination with one or more drain pipes 51. The catch basins 50, 50' vertically extend through the containment systems 2, 2' at desired locations, passing through the various layers of the containment systems 2, 2' and into the earthen bottoms 13, 17, 18, 44 that form the basins 9, 10, 45. The number and locations of the catch basins will vary to suit a given site. The catch basins must be located at positions that will not interfere with machinery at the site, such as well heads in the case of a drilling site. The drain pipes 51 extend from the catch basins 50, 50' and preferably extend fully along the length of the containment systems 2, 2'. The drain pipes 51 can then communicate with a drainage field, one or more holding tanks in situations where impermeable soils could compromise the effective operation of a drainage field, or some other suitable fluid discharge system. To facilitate drainage, the drain pipes 51 are preferably pitched away from the catch basins 50, 50' to direct fluids away from the catch basins. A pitch on the order of ⅛ inch per foot can typically be provided for this, but can freely be varied to suit a particular installation.

A preferred example of an overall installation of a drainage system 15 in a containment system 5, 6 will be described with reference to FIGS. 4 and 5, and will generally proceed as follows. Prior to construction of each of the containment systems 5, 6, as previously described, a trench 52 is suitably excavated along the desired location for the drain pipes 51, and to receive each of the catch basins 50. A suitable material 53, such as a compacted modified gravel base, for example, a 95% compacted modified gravel base, is placed in the trench 52 so that sections of the drain pipes 51 are surrounded by the material 53. The sections of drain pipe 51 are preferably formed from 6 inch perforated PVC piping material. The catch basins 50 are placed over the drain pipes 51, resting on the material 53, and are suitably connected to the drain pipes 51 so the catch basins 50 are placed in fluid communication with the drain pipes 51. The catch basins 50 and the material 53 are then covered with earth, forming the bottom 13, 16, 17 of the associated basin 9, 10. Installation of the associated containment system 2 then proceeds as previously described.

Although any of a variety of fluid collecting tanks can be used to implement the function of the drainage system 15, 15', the catch basins 50 are particularly well suited to the containment systems 2, 2' of the present invention. A preferred construction for one of the catch basins 50 is shown in FIGS. 10 to 12.

The catch basin 50 is preferably cylindrical in overall shape and configuration, although other shapes can be developed for use, if desired, and generally includes a lower, base section 55, an intermediate, riser section 56, and an upper, cone section 57. The use of three sections 55, 56, 57 is well suited to containment systems having a configuration, primarily depths, similar to those previously described. Other catch basins, having fewer sections or additional sections, can also be developed for use with the containment systems which have previously been described, or to implement other containment systems for developing other installations. The catch basins and their various sections are preferably manufactured from precast concrete, and can incorporate additional, stainless steel reinforcements for structural integrity, if desired.

The base section 55 is formed as a basin having a cylindrical side wall 58, and a bottom 59 for receiving a drainage mechanism 60. As an example, the side wall 58 has a diameter on the order of 48 inches, and a thickness on the order of 5 inches, and the bottom 59 has a thickness on the order of 12 inches. The center of the bottom 59 is provided with an opening 61 for receiving the drainage mechanism 60, and establishes a drain 62 for communicating with the drain pipes 51 as previously described. To this end, the drainage mechanism 60 preferably includes a section 63 of PVC drain pipe having, for example, a diameter of 6 inches, for connection to the drain pipes 51 using conventional techniques.

The preferred drainage mechanism 60 illustrated further includes a drainage valve 65 which is preferably fixed to the pipe section 63 using conventional techniques for the assembly of PVC components. A butterfly valve is preferably used for the drainage valve 65, although other types of valves can also be used to implement the drainage valve 65, if desired. The drainage valve 65 is preferably formed of stainless steel, to more effectively resist corrosion in a potentially harsh environment. However, other materials can also be used, if preferred for a particular application. As an alternative, multiple drainage valves can be used, for example, to provide redundancy for purposes of preventing an unintended discharge of fluids.

An actuator arm 64 extends from the butterfly valve, for conventional operation of the drainage valve 65. The drainage mechanism 60 is preferably controlled from the surface, for convenient use in the control and the release of fluids collected by the catch basins 50 to a different containment system 2, 2', or to a drainage field, holding tank or some other system provided for the fluids being discharged, if necessary, after the fluid collected in the catch basin 50 has been tested for environmental safety and compatibility. The drainage mechanism 60 is preferably left open during periods of inactivity, for example, when there is no drilling or during well work-over activity, to serve as a drain for the normal occurrence of precipitation. A conventional actuator bar 66 is preferably coupled with the arm 64, extending upwardly for the convenience of an operator. The actuator bar 66 can be left loose, within the upper section 57, or can be attached to the interior of the upper section 57, as desired.

The drainage mechanism 60 is preferably removably retained within the opening 61, using an expandable coupling 67, to facilitate installation and subsequent servicing. In the embodiment shown, the expandable coupling 67 includes an elastomeric seal 68 extending around and between the pipe section 63 and the opening 61. A compression fitting 69 is preferably coupled with the elastomeric seal 68 to ensure an effective seal between the pipe section 63 and the opening 61. A preferred compression fitting 69 is implemented with plural bolts 70 extending through the elastomeric seal 68, mated with nuts 71 for compressing the elastomeric seal 68 at various locations. Upper and lower compression rings 72 can also be provided to facilitate uniform compression of the elastomeric seal 68, if desired. The bolts 70, nuts 71 and compression rings 72, if used, are preferably formed of stainless steel to more effectively resist corrosion in a potentially harsh environment. However, other materials can also be used, if preferred for a particular application.

A standpipe 73 is preferably removably coupled to the drainage valve 65, and extends vertically through the base section 55 and the riser section 56, into the upper section 57. The standpipe 73 serves to establish a level for fluids collected in the catch basin 50 for those catch basins which are associated with a containment system 2, 2' which is actively being used for the collection and storage of fluids. To this end, the top of the standpipe 73 is preferably placed in general alignment with the top of the drainage layer 32, as shown. This is preferred so that collected fluids can be stored in the drainage layer 32, while preventing fluids from collecting in the base layer 36. This prevents fluids from collecting in the base layer 36 and reaching the exposed surface 20 of the containment system 2, 2', which is important for reasons of safety. As an example, the standpipe 73 can be implemented using a section of PVC pipe having a diameter of 6 inches and a height on the order of 8 feet.

The standpipe 73 is preferably removably coupled with the drainage valve 65 to allow the standpipe 73 to be selectively installed in desired catch basins 50, and for subsequent servicing. For some installations, it can be desirable to make use of some of the containment systems 2, 2' to actively collect fluids, while leaving other containment systems 2, 2' available to receive fluids for overflow or emergency purposes. As an example, the endmost containment systems 5 shown in FIG. 1 can be left empty to receive overflow from the remaining containment systems 6, for fluid management or emergency purposes. Removal of the standpipe 73 from the drainage valve 65 establishes a fluid level below the drainage layer 32, leaving the associated containment system available to receive fluids from other sources, as may be needed. To this end, the standpipe 73 can be removably coupled with the drainage valve 65 using a "Fernco®" coupling, or other conventional hardware, located at 74. Removably coupling the standpipe 73 with the drainage valve 65 also allows the standpipe 73 to be removed when drainage of the associated containment system becomes necessary or desirable, for example, when active operation of a particular containment system is to be suspended, or discontinued.

The riser section 56 is formed as a sleeve having a cylindrical side wall 76 with a diameter and a thickness which preferably correspond to the diameter and thickness of the cylindrical side wall 58 of the base section 55. The side wall 76 preferably includes plural openings 77, 78 for passing fluids to the interior 79 of the catch basin 50.

A first series of openings 77 are provided at spaced locations along the side wall 76, extending through the side wall 76 and into the interior 79. The size, shape and number of openings 77 provided, as well as the spacing of the openings 77, can be freely varied to suit a given installation and to achieve appropriate drainage into the catch basin 50. In addition, the sizes and shapes of the openings 77 should be selected to prevent drainage stone located along the side wall 76 from passing into or clogging the openings 77.

A second series of openings 78 are provided at spaced locations along the lower edge 80, extending through the side wall 76 and into the interior 79. The size, shape and number of openings 78 provided, as well as the spacing of the openings 78, can also be freely varied to suit a given installation and to achieve appropriate drainage into the catch basin 50. To achieve significant fluid flows, the openings 78 are preferably enlarged relative to the openings 77. To prevent drainage stone located along the side wall 76 from passing through the openings 78, perforated sheets 81 are preferably embedded in the lower edge 80 of the riser section 56 during manufacture of the riser section 56, as is best shown in FIG. 11. The perforated sheets 81 are preferably formed of stainless steel, to more effectively resist corrosion, and can have a thickness of from 1/8 inch to 2 inches, preferably on the order of 1/4 inch, with apertures 82 having sizes from 1/8 inch to 2 inches, and preferably on the order of 1/4 inch. Similar functionality can be achieved using spaced bars replacing the perforated sheets 81 or by using a geotextile fabric as a filtering medium. The openings 77, 78 can also be provided with a filtering medium or a suitable filtration unit can be provided in the catch basin 50 to filter fluids entering the catch basin 50, for example, to filter contaminants or dissolved solids from the received fluids.

The perforated sheets 81, or other structures such as spaced bars and the like provided for similar purposes, are preferably associated with a compression ring 83 which extends along and which is secured to the lower edge 80 of the riser section 56. Referring to FIGS. 11 and 12, the ring 83 preferably fully encircles the lower edge 80 of the riser section 56, and is preferably fixed to the perforated sheets 81 so that when the perforated sheets 81 are embedded in the lower edge 80 of the riser section 56, the ring 83 is also secured to the lower edge 80. As an alternative, the ring 83 can be attached to the lower edge 80 using known hardware extending through the ring 83 and into the lower edge 80. A similar compression ring 84 is associated with the upper edge 85 of the base section 55, and preferably includes a T-section 86 which can be embedded in the upper edge 85 of the base section 55 during manufacture of the base section 55. The T-section 86 can be developed using a series of individual plates or a single continuous ring appropriately fixed to the ring 84 so the ring 84 and the associated T-section 86 can be embedded in the upper edge 85 of the base section 55 during its manufacture. As an alternative, the ring 84 can be attached to the upper edge 85 of the base section 55 using known hardware extending through the ring 84 and into the upper edge 85. The rings 83, 84 and the T-section 86, if used, are preferably formed of stainless steel, to more effectively resist corrosion, and preferably have a thickness on the order of 1/4 inch, similar to the perforated sheets 81.

The rings 83, 84 provide bearing surfaces for joining the base section 55 and the riser section 56 while protecting the upper edge 85 of the base section 55 and the lower edge 80 of the riser section 56 from damage during installation, and to more effectively receive materials between the two structures as will be more fully described below. For additional assurances at this interface, the rings 83, 84 are also preferably provided with the lock rings 87, 88 which are best illustrated with reference to FIGS. 11 and 12. In the illustrated embodiment, four lock rings 87 are associated with the ring 83 and one lock ring 88 is associated with the ring 84. However, any number of lock rings 87, 88 can be associated with the rings 83, 84, responsive to the application being implemented. The lock rings 87, 88 are also preferably formed of stainless steel to more effectively resist corrosion. It is anticipated that, using such structures, the riser section 56 can be placed on the base section 55, and can be effectively held in position by the earth and drainage stone surrounding the catch basin 50. As an alternative, additional plates or brackets can be secured to and between the base section 55 and the riser section 56 to further ensure the structures are appropriately held in position, after they have been set in place. As a further alternative, a simple gasket can be used to mate the upper edge 85 of the base section 55 and the lower edge 80 of the riser section 56, if desired.

The upper section 57 has a cylindrical side wall 90 formed along a lower section 91, and preferably includes an eccentric section 92 which tapers from the lower section 91 to a manhole cover 93 for enclosing the catch basin 50. The cylindrical side wall 90 has a diameter and thickness which preferably correspond to the diameter and thickness of the cylindrical side wall 76 of the riser section 56. The shape of the eccentric section 92 will vary to suit the particular installation being performed. The upper edge 94 of the riser section 56 and the lower edge 95 of the upper section 57 are advantageously provided with cooperating notches so that placement of the upper section 57 on the riser section 56 will effectively hold the sections 56, 57 in position, together with the drainage stone surrounding the sections 56, 57. As an alternative, additional plates or brackets can be secured to and between the upper section 57 and the riser section 56 to further ensure the structures are appropriately held in position, after they have been set in place.

The catch basin 50 shown in FIGS. 10 to 12 has three sections, which is well suited to the configuration of the illustrated containment system 2, 2'. However, other catch basins, having fewer sections or additional sections, can also be developed. For example, upper portions of the riser section 56 can be fitted with a tapered section 92 and a manhole cover 93 similar to the structures of the upper section 57 to produce a catch basin 50' having two sections, as shown in FIG. 9. As a further alternative, additional sections having mating notched edges similar to the upper edge 94 of the riser section 56 and the lower edge 95 of the upper section 57 can be provided to cooperate with the notched edges 94, 95 of the riser section 56 and the upper section 57, to produce a catch basin having one or more additional sections capable of providing increased height if desired, for example, to collect increased amounts of fluid in the containment systems available at a given site.

While various components associated with the catch basin 50 are preferably formed of stainless steel materials, to effectively resist corrosion, it is to be understood that other corrosion-resistant materials can be also used, if preferred for a particular application.

A preferred example of an installation of a catch basin 50 will generally proceed as follows. When the catch basins 50 are placed over the drain pipes 51, as part of the overall installation previously described, the base section 55 of each catch basin 50 is placed on the base material 53 and the drain 62 is suitably coupled with the drain pipe 51 by connecting the pipe section 63 to the adjacent drain pipe 51 using conventional techniques. The base section 55 of the catch basin 50 is then covered with earth until the earth is brought to a level which approximates, but which is below the upper edge 85 of the base section 55.

The buffer layer 26 is placed over the earthen bottom 13, 17, 18 of a basin 9, 10, preferably to a level slightly below the edge 85. If used, as is preferred for most installations, the leak detection grid 40 is then placed over the buffer layer 26. The membrane 30 is then laid and placed over the upper edge 85 of the base section 55, so the membrane 30 can be captured between the rings 83, 84 when the riser section 56 is mated with the base section 55. The membrane 30 is then suitably cut away from interior portions of the base section 55 so the riser section 56 can freely communicate with the base section 55. The resulting periphery of the membrane 30 will then be securely held in place between the rings 83, 84, and between the riser section 56 and the base section 55 of the catch basin 50. Joints established between the membrane 30 and the rings 83, 84 are preferably sealed to prevent leakage that could cause a false reading of the leak detection system and to prevent backflow from the catch basin 50 into the soil below the membrane 30, for example, by applying a mastic layer along the periphery of the membrane 30 or over the rings 83, 84. The riser section 56 of the catch basin 50 is placed over and mated with the base section 55, and the upper section 57 is placed over and mated with the riser section 56, completing the assembly of the catch basin 50. The geotextile fabric 31 is then placed over the membrane 30, and the remainder of the overall installation can then proceed as previously described.

The containment systems of the present invention are capable of numerous modifications to accommodate any of a variety of applications. Various modifications of the foregoing system have previously been described. In addition, overall operation of the system of the present invention can be modified to yield still further variations and applications.

For example, the system of the present invention can operate to drain fluids collected in the containment system 2, 2', for example, in the base layer 36 and the drainage layer 32, for discharge to a drainage field, or for collection in the catch basins or one or more holding tanks, for subsequent extraction and removal.

As an alternative to such "open loop" operation, the fluid containment system of the present invention is preferably used to store collected fluids on site, serving as a retention reservoir for the collected fluids. The collected fluids can then be used for future operations, establishing a "closed loop" system that can eliminate the need to remove potentially contaminated fluids from the site, to treat such fluids following their removal, and to obtain fresh fluids for use in future operations.

As an example, for a fracking operation, the current practice is to bring water to the well pad, for use in performing a fracking process to break open shale formations and extract gas from the gas-bearing shale bed. This produces waste fluids which are typically removed from the site, and which generally contain the chemicals and salty brine used as part of the fracking process, or that came naturally out of the ground.

The fracking process requires the use of a significant amount of water, generally on the order of 3 to 5 million gallons of water for the fracking of a single well. Because amounts of water of this magnitude are generally not available at the well pad site, water must be brought to the pad site and removed from the pad site by trucks, in turn requiring many hundreds, if not thousands of runs to be performed, and presenting any of a number of disadvantages including road wear, traffic congestion, noise, exhaust fumes and excessive fuel costs.

To reduce the adverse affects of such trucking, it has become a common practice to develop reservoirs as close to the well pad site as is possible, and to store fracking fluids from an operating well pad, for use in future fracking operations at the well pad site. Because the reservoirs generally cannot be placed at the well pad site, due to the topography of a typical site, the trucking of fluids can be reduced, but nevertheless remains necessary to some extent.

Such closed-loop systems have become the method most often preferred by local governments and environmentalists, and the most cost-effective for the gas and oil companies operating such sites. In practice, however, such reservoirs can also exhibit disadvantages. For example, this requires other sites to be developed for use, and remediated following their use. There is also the potential for the leakage of brackish water from such reservoirs, in the event of an overflow due to rainfall, for example, or if the reservoirs are not properly maintained. Such open reservoirs have also been found to be potentially deleterious to the local animal population, particularly birds, that might drink water from such reservoirs.

Such problems can be overcome by the fluid containment system of the present invention by using the containment systems to store fluids on-site and eliminate the need for remotely located reservoirs, or the trucking required to transfer fluids between the well pad site and such reservoirs. Based on volume, a well pad site having a size of 180,000 square feet (300 feet×600 feet), fitted with a fluid containment system in accordance with the present invention, will be able to store on the order of 2 million gallons of fluid at a 48% storage rate and up to 5 million gallons of fluid when completely filled, and can be easily modified to hold larger quantities, for example, by increasing the depth of available containment systems. Similar amounts of water can also be stored on smaller sites, for example, a site having a size on the order of 4-acres, by similarly increasing the depth of available containment systems.

In any event, such fluids can then be drawn from the catch basins 50, the drain pipes 51, or any holding tanks employed, for transfer to or between containment systems, for use in re-fracking operations, or for the fracking of new well heads developed at the well pad site. The amount of fluid retained at the well pad site can be varied, as needed, by constructing additional containment systems on the well pad or by increasing the overall depth of the catch basins, as previously described, or by the construction of ancillary compartments that can hold additional fluids adjacent to the well pad.

This can serve to eliminate a significant amount of trucking, and will be supplemented by local rainfall, still further reducing the amount of water that needs to be used and/or transported. Instead, the fluid for future fracking operations will be stored under the well pad, for convenient access to such stored fluids. In areas where rainfall is limited, water can initially be delivered to the site, for example, by truck, and stored at the site for future use. While this can initially require a significant amount of trucking, the need for subsequent trucking to the site can be significantly reduced.

In addition, the perimeter berms 7 will offer additional protection, yielding a 100% containment for the fluids used in the fracking and drilling processes taking place, and the stored fluids will be compartmentalized for better flow.

The use of a leak detection system, as previously described, will further allow the site to be monitored for leakage. In the event a leak is detected, retained fluids can be removed to another available containment system, for example, one of the two endmost containment systems 5, as previously described, a holding tank or other ancillary compartment, while necessary repairs are performed, providing further assurances of an environmentally compatible operation. Any fluids released from blow-outs, spills or other accidents on the well pad can be similarly handled. Use of the endmost containment systems 5 is presently considered to be preferred because less traffic and other operations are generally encountered than in other regions of the well pad 1.

This then allows fracking fluids to be drained back into the on-site containment systems, to be reused for future fracking processes, as desired. Because the well pad will be self-contained, the hauling of fluids to off-site reservoirs is no longer required. Because the fluids are retained underground, the possibility that birds or other animals may be affected is effectively eliminated. There will also be reduced opportunity for the fluids to freeze when stored underground.

Following the completion of operations at a given site, restoration and remediation can proceed in a manner similar to that previously described. On-site fracking fluids, if found to be safe, can be released or otherwise removed. Any contaminated fluids can be treated on-site, or removed for appropriate treatment elsewhere.

As an alternative to the restoration of a site which is no longer being developed, it can be desirable for some sites to remain dormant for a period of time, and to later be reactivated. For example, it is not uncommon for it to become necessary to periodically re-frack a well over a period of years, typically, every three to seven years. Such a site can be restored during dormant periods by placing a geotextile fabric over the base layer 36, and the berm 7, if desired, and by then covering the geotextile fabric with soil to allow the growth of vegetation, such as grass or some other desired ground covering. Fluids in the containment systems located at the site will nevertheless remain available for operations at other sites, if desired. When use of the site is to be resumed, the soil and the geotextile fabric can be removed, allowing the site to be placed back in operation. Fluids for resumed operations at the site will then be readily available and stored in the containment systems located at the site.

Such installations can, in turn, help protect the environment in various ways. Significantly fewer trucks on the roads will lead to less noise, less fuel use, less diesel exhaust, less traffic and fewer accidents. All accidents, spills and blow outs will be contained. Above ground reservoirs will no longer be needed, and overall, less reservoirs will be required, resulting in less land that needs to be reclaimed. This will also reduce the costs of constructing the reservoirs, and reduce leasing costs for the land that will no longer be needed for such reservoirs.

It will be understood that while the present invention has been described based on specific embodiments incorporating specified parts, the present invention further encompasses all enabled equivalents of the parts described, and that various changes in the details, materials and arrangement of parts which have been herein described and illustrated in order to explain the nature of this invention may be made by those skilled in the art within the principle and scope of the invention as expressed in the following claims.

What is claimed is:

1. A system for containing and managing fluids produced at a work site and including a fluid containment comprising:
    a basin having a bottom and a plurality of side walls within a perimeter of the basin;
    a buffer layer placed over the bottom and the side walls of the basin;
    a fluid-impermeable membrane placed over the buffer layer and extending along the side walls of the basin; and
    drainage stone placed over the impermeable membrane and filling the basin, wherein the drainage stone includes a drainage layer formed of a relatively coarse material placed over the impermeable membrane and a base layer formed of a less coarse material placed over the drainage layer, and a drainage median formed of the relatively coarse material extends through the base layer.

2. The system of claim 1 wherein the impermeable membrane is formed of a thermoplastic olefin or polyolefin (TPO).

3. The system of claim 1 wherein the impermeable membrane is formed of a material selected from the group of materials consisting of polyvinyl chloride (PVC), chlorinated polyethylene (CPE), chlorosulfonated polyethylene (CSPE), ketone ethylene ester (KEE) and ethylene propylene diene monomer (EPDM).

4. The system of claim 1 wherein the impermeable membrane has a thickness of from 40 mils to 135 mils.

5. The system of claim 1 wherein the buffer layer is granular material having a thickness of from 1 to 3 inches.

6. The system of claim 1 which further includes a geotextile fabric placed over the impermeable membrane.

7. The system of claim 1 which further includes a leak detection system coupled with the impermeable membrane.

8. The system of claim 7 wherein the leak detection system includes a leak detection grid coupled with the impermeable membrane, and a leak detection monitor electrically coupled with the leak detection grid.

9. The system of claim 7 wherein the leak detection system includes a leak detection grid integrated with the impermeable membrane, and a leak detection monitor electrically coupled with the leak detection grid.

10. The system of claim 1 which further includes a trench placed outside of and adjacent to the perimeter, for retaining the impermeable membrane in position.

11. The system of claim 1 which further includes a geotextile fabric between the drainage layer and the base layer.

12. The system of claim 1 which further includes a berm projecting from at least some of the side walls, forming a perimeter of the basin.

13. The system of claim 1 which further includes a berm surrounding the side walls.

14. The system of claim 1 which further includes a stone median surrounding the side walls.

15. The system of claim 1 which further includes a drainage system coupled with the fluid containment.

16. The system of claim 15 wherein the drainage system includes a catch basin extending through the basin and the drainage stone filling the basin, and a drain pipe in fluid communication with the catch basin.

17. The system of claim 16 wherein the drain pipe is in fluid communication with a drainage field or a holding tank.

18. The system of claim 1 which includes a plurality of cooperating fluid containments.

19. The system of claim 18 wherein the plurality of fluid containments cooperate to form an open system for discharging fluids from the containing and managing system.

20. The system of claim 18 wherein the plurality of fluid containments cooperate to form a closed system for retaining fluids in the containing and managing system.

21. A system for containing and managing fluids produced at a work site and including a fluid containment comprising:
    a basin having a bottom and a plurality of side walls;
    a berm projecting from at least some of the side walls, forming a perimeter of the basin;
    a buffer layer placed over the bottom and the side walls of the basin;
    a fluid-impermeable membrane placed over the buffer layer and extending along the side walls of the basin and over at least portions of the berm;
    drainage stone placed over the impermeable membrane and filling the basin;

a drainage system coupled with the fluid containment, wherein the drainage system includes a catch basin extending through the basin and the drainage stone filling the basin, and a drain pipe in fluid communication with the catch basin; and, wherein the catch basin has a side wall defining a fluid-containing enclosure, a drain at a bottom of the enclosure for communicating with the drain pipe, an actuator at a top of the enclosure and coupled with the drain for operation of the drain, and a plurality of openings formed in mid-portions of the enclosure.

22. The system of claim 21 wherein the enclosure is formed as an upper section and a lower section.

23. The system of claim 22 which further includes at least one additional section joining the upper section and the lower section.

24. The system of claim 22 which further includes a compression ring between the upper section and the lower section.

25. The system of claim 21 which further includes a drainage assembly coupled with the drain.

26. The system of claim 25 which further includes an expandable coupling between the drainage assembly and the drain.

27. The system of claim 26 wherein the expandable coupling includes an elastomeric seal located between the drainage assembly and the drain and surrounding portions of the drainage assembly, and a compression fitting coupled with the elastomeric seal for compression of the elastomeric seal.

28. The system of claim 25 wherein the drainage assembly includes a drain valve coupled with the actuator.

29. The system of claim 28 wherein the drainage assembly further includes a lower section of pipe attached to and connecting the drain valve and the drain pipe.

30. The system of claim 28 wherein the drain valve is located at a level beneath the drainage stone.

31. The system of claim 28 wherein the drainage assembly further includes an upper section of pipe removably attached to the drain valve.

32. The system of claim 31 wherein the drainage stone includes a drainage layer formed of a relatively course material placed over the impermeable membrane, and a base layer formed of a less course material placed over the drainage layer, and wherein the upper section of pipe extends upwardly, to a level approximating top portions of the drainage layer.

33. The system of claim 21 which further includes a plurality of perforated sheets or bars enclosing at least some of the openings of the enclosure.

* * * * *